(12) United States Patent
Sharma et al.

(10) Patent No.: US 12,502,181 B2
(45) Date of Patent: Dec. 23, 2025

(54) SURGICAL SYSTEMS AND METHODS FOR DETERMINING BREAKTHROUGH DEPTH OF CUTTING TOOLS

(71) Applicant: Stryker Corporation, Kalamazoo, MI (US)

(72) Inventors: Rahul Sharma, Gurgaon (IN); Trevor Jonathan Lambert, Portage, MI (US)

(73) Assignee: Stryker Corporation, Portage, MI (US)

( * ) Notice: Subject to any disclaimer, the term of this patent is extended or adjusted under 35 U.S.C. 154(b) by 231 days.

(21) Appl. No.: 18/253,559

(22) PCT Filed: Nov. 18, 2021

(86) PCT No.: PCT/US2021/059890
§ 371 (c)(1),
(2) Date: May 18, 2023

(87) PCT Pub. No.: WO2022/109135
PCT Pub. Date: May 27, 2022

(65) Prior Publication Data
US 2023/0414228 A1    Dec. 28, 2023

Related U.S. Application Data

(60) Provisional application No. 63/115,590, filed on Nov. 18, 2020.

(51) Int. Cl.
*A61B 17/16* (2006.01)
*A61B 90/00* (2016.01)

(52) U.S. Cl.
CPC ...... *A61B 17/1626* (2013.01); *A61B 17/1622* (2013.01); *A61B 2090/062* (2016.02)

(58) Field of Classification Search
CPC . A61B 17/16; A61B 17/1613; A61B 17/1615; A61B 17/1617; A61B 17/162;
(Continued)

(56) References Cited

U.S. PATENT DOCUMENTS 6,033,409 A * 3/2000 Allotta ............... B25F 5/003
606/80
6,665,948 B1 * 12/2003 Kozin ............... A61B 90/06
175/45

(Continued)

FOREIGN PATENT DOCUMENTS

| WO | 2019035096 A1 | 2/2019 |
| WO | 2020092951 A2 | 5/2020 |
| WO | 2020232413 A2 | 11/2020 |

OTHER PUBLICATIONS

Partial International Search Report for Application No. PCT/US2021/059890 dated Feb. 23, 2022, 2 pages.
(Continued)

*Primary Examiner* — Eric S Gibson
(74) *Attorney, Agent, or Firm* — Howard & Howard Attorneys PLLC

(57) ABSTRACT

A surgical system for determining breakthrough depth of a bore in a bone passing through a proximal cortical layer of bone and a distal cortical layer of bone. The surgical system includes an instrument for coupling to a cutting tool. A sensor is coupled to the instrument to generate one or more depth measurements of the cutting tool as the cutting tool cuts through the bone. The breakthrough depth is determined based on depth measurements made after the cutting tool passes through the proximal cortical layer of bone. The breakthrough depth is optionally based on a type of bone being cut, bone hardness, and cutting tool selection.

16 Claims, 8 Drawing Sheets

(58) Field of Classification Search
CPC ............ A61B 17/1622; A61B 17/1624; A61B 17/1626; A61B 17/1628; A61B 17/1633; A61B 17/1655; A61B 17/1657; A61B 2090/062
See application file for complete search history.

(56) References Cited

U.S. PATENT DOCUMENTS

| | | | | |
|---|---|---|---|---|
| 7,580,743 | B2* | 8/2009 | Bourlion | A61B 5/053 606/80 |
| 8,821,493 | B2* | 9/2014 | Anderson | A61B 90/06 606/171 |
| 8,894,654 | B2* | 11/2014 | Anderson | B25B 21/002 173/176 |
| 9,204,885 | B2* | 12/2015 | McGinley | A61B 17/162 |
| 9,358,016 | B2* | 6/2016 | McGinley | A61B 17/162 |
| 9,370,372 | B2* | 6/2016 | McGinley | A61B 17/1626 |
| 9,468,445 | B2* | 10/2016 | McGinley | A61B 17/1615 |
| 9,492,181 | B2* | 11/2016 | McGinley | A61B 17/162 |
| 9,526,511 | B2* | 12/2016 | Anderson | A61B 17/1633 |
| 9,554,807 | B2* | 1/2017 | McGinley | B08B 3/04 |
| 9,826,984 | B2* | 11/2017 | McGinley | A61B 17/142 |
| 9,877,734 | B2* | 1/2018 | Anderson | A61B 17/1622 |
| 10,149,686 | B2* | 12/2018 | Anderson | A61B 17/1626 |
| 10,159,495 | B1* | 12/2018 | Lambert | A61B 17/1615 |
| 10,245,043 | B2* | 4/2019 | Xie | A61B 17/162 |
| 10,321,921 | B2* | 6/2019 | McGinley | A61B 17/1626 |
| 10,398,453 | B2* | 9/2019 | McGinley | A61B 90/30 |
| 10,736,643 | B2* | 8/2020 | Anderson | A61B 17/1633 |
| 10,736,644 | B2* | 8/2020 | Windolf | A61B 17/1622 |
| 10,893,873 | B2* | 1/2021 | McGinley | A61B 17/1626 |
| 10,925,619 | B2* | 2/2021 | Anderson | B25B 23/0064 |
| 11,058,436 | B2* | 7/2021 | McGinley | A61B 17/142 |
| 11,317,927 | B2* | 5/2022 | Carusillo | A61B 90/06 |
| 11,382,639 | B2* | 7/2022 | Miller | A61B 17/1624 |
| 11,426,180 | B2* | 8/2022 | O'Brien | A61B 17/162 |
| 11,478,255 | B2* | 10/2022 | Windolf | A61B 17/1626 |
| 11,517,326 | B1* | 12/2022 | Sharma | A61B 17/1615 |
| 11,540,841 | B2* | 1/2023 | Carusillo | A61B 17/1626 |
| 11,857,204 | B2* | 1/2024 | Windolf | A61B 17/1633 |
| 11,896,239 | B2* | 2/2024 | Carusillo | A61B 17/162 |
| 12,133,654 | B2* | 11/2024 | Carusillo | A61B 17/1615 |
| 2004/0215395 | A1* | 10/2004 | Strasser | B23B 49/006 702/9 |
| 2005/0116673 | A1* | 6/2005 | Carl | A61B 17/1626 318/432 |
| 2005/0131415 | A1* | 6/2005 | Hearn | B25B 23/147 606/80 |
| 2006/0241628 | A1* | 10/2006 | Parak | A61B 17/1626 606/80 |
| 2009/0245956 | A1* | 10/2009 | Apkarian | A61B 17/1695 408/11 |
| 2009/0326537 | A1* | 12/2009 | Anderson | A61B 17/1624 606/80 |
| 2011/0245833 | A1* | 10/2011 | Anderson | A61B 17/1628 606/80 |
| 2014/0371752 | A1* | 12/2014 | Anderson | A61B 17/17 606/80 |
| 2015/0066030 | A1* | 3/2015 | McGinley | A61B 90/30 606/79 |
| 2015/0066035 | A1* | 3/2015 | McGinley | A61B 17/162 606/80 |
| 2015/0066036 | A1* | 3/2015 | McGinley | A61B 17/162 606/80 |
| 2015/0066037 | A1* | 3/2015 | McGinley | A61B 17/1628 606/80 |
| 2015/0066038 | A1* | 3/2015 | McGinley | A61B 17/1615 606/80 |
| 2015/0080966 | A1* | 3/2015 | Anderson | B25B 23/0064 606/280 |
| 2015/0141999 | A1* | 5/2015 | McGinley | B08B 3/04 606/82 |
| 2015/0148805 | A1* | 5/2015 | McGinley | A61L 2/07 422/26 |
| 2015/0148806 | A1* | 5/2015 | McGinley | B08B 3/08 606/82 |
| 2015/0272608 | A1* | 10/2015 | Gladstone | A61B 17/1622 606/167 |
| 2016/0120553 | A1* | 5/2016 | Xie | A61B 17/162 606/80 |
| 2016/0128704 | A1* | 5/2016 | McGinley | A61B 17/17 606/86 R |
| 2016/0206328 | A1* | 7/2016 | Lo | A61B 17/1626 |
| 2017/0007289 | A1* | 1/2017 | McGinley | A61B 17/142 |
| 2017/0143396 | A1* | 5/2017 | McGinley | A61B 90/06 |
| 2017/0143440 | A1* | 5/2017 | McGinley | A61B 34/20 |
| 2018/0325528 | A1* | 11/2018 | Windolf | A61B 17/1622 |
| 2020/0054410 | A1 | 2/2020 | Pfotenhauer et al. | |
| 2021/0186524 | A1* | 6/2021 | Carusillo | A61B 17/1622 |
| 2022/0241045 | A1* | 8/2022 | Carusillo | A61B 17/1615 |
| 2023/0338044 | A1* | 10/2023 | Sharma | A61B 17/1622 |
| 2023/0414228 | A1* | 12/2023 | Sharma | A61B 17/1626 |

OTHER PUBLICATIONS

International Search Report for Application No. PCT/US2021/059890 dated Apr. 14, 2022, 2 pages.

* cited by examiner

SURGICAL SYSTEMS AND METHODS FOR DETERMINING BREAKTHROUGH DEPTH OF CUTTING TOOLS

RELATED APPLICATIONS

This application is the National Stage of International Patent Application No. PCT/US2021/059890, filed on Nov. 18, 2021, which claims priority to and the benefit of U.S. Provisional Patent Application No. 63/115,590, filed on Nov. 18, 2020, the entire contents of which are hereby incorporated by reference.

BACKGROUND

Conventional medical and surgical procedures routinely involve the use of surgical tools and instruments which allow surgeons to approach and manipulate surgical sites. By way of non-limiting example, rotary instruments such as handheld drills are commonly utilized in connection with orthopedic procedures to address various musculoskeletal conditions, such as trauma, sports injuries, degenerative diseases, joint reconstruction, and the like. In procedures where handheld drills or similar surgical instruments are employed, rotational torque selectively generated by an actuator (e.g., an electric motor) is used to rotate a releasably-attachable drill bit or other surgical attachments at different speeds.

A surgical handpiece assembly drills bores in the tissue against which the drill bit is applied. One type of surgical procedure in which it is necessary to drill a bore is a trauma procedure to repair a broken bone. In this type of procedure, an elongated rod, sometimes called a nail, is used to hold the fractured sections of the bone together. To hold the nail in place, one or more bores are driven into the bone. These bores are positioned to align with complementary holes formed in the nail. A screw is inserted in each aligned bore and nail hole. The screws hold the nail in the proper position relative to the bone.

In another type of procedure, an implant known as a plate is secured to the outer surfaces of the fractured sections of a bone to hold the sections together. Screws hold the plate to the separate sections of bone. To fit a screw that holds a plate to bone it is necessary to first drill a bore to receive the screw.

As part of a procedure used to drill a screw-receiving bore in a bone, it is desirable to know the depth of the bore. This information allows the surgeon to select size of screw that is fitted in the bore hole. Accordingly, an integral part of many bone bore-forming procedures is the measuring of the depth of the bore. Currently, this measurement is often taken with a depth gauge separate from the drill. This requires the surgeon to, after withdrawing the drill bit from the bore, insert the depth gauge into the bore. Then, based on tactile feedback, the surgeon sets the gauge so the distal end of the gauge only extends to the far opening of the bore. Once these processes are complete, the surgeon reads the gauge to determine the depth of the bore.

It is desirable to identify methods and apparatus that improve these devices and methods.

SUMMARY

Figure 1:
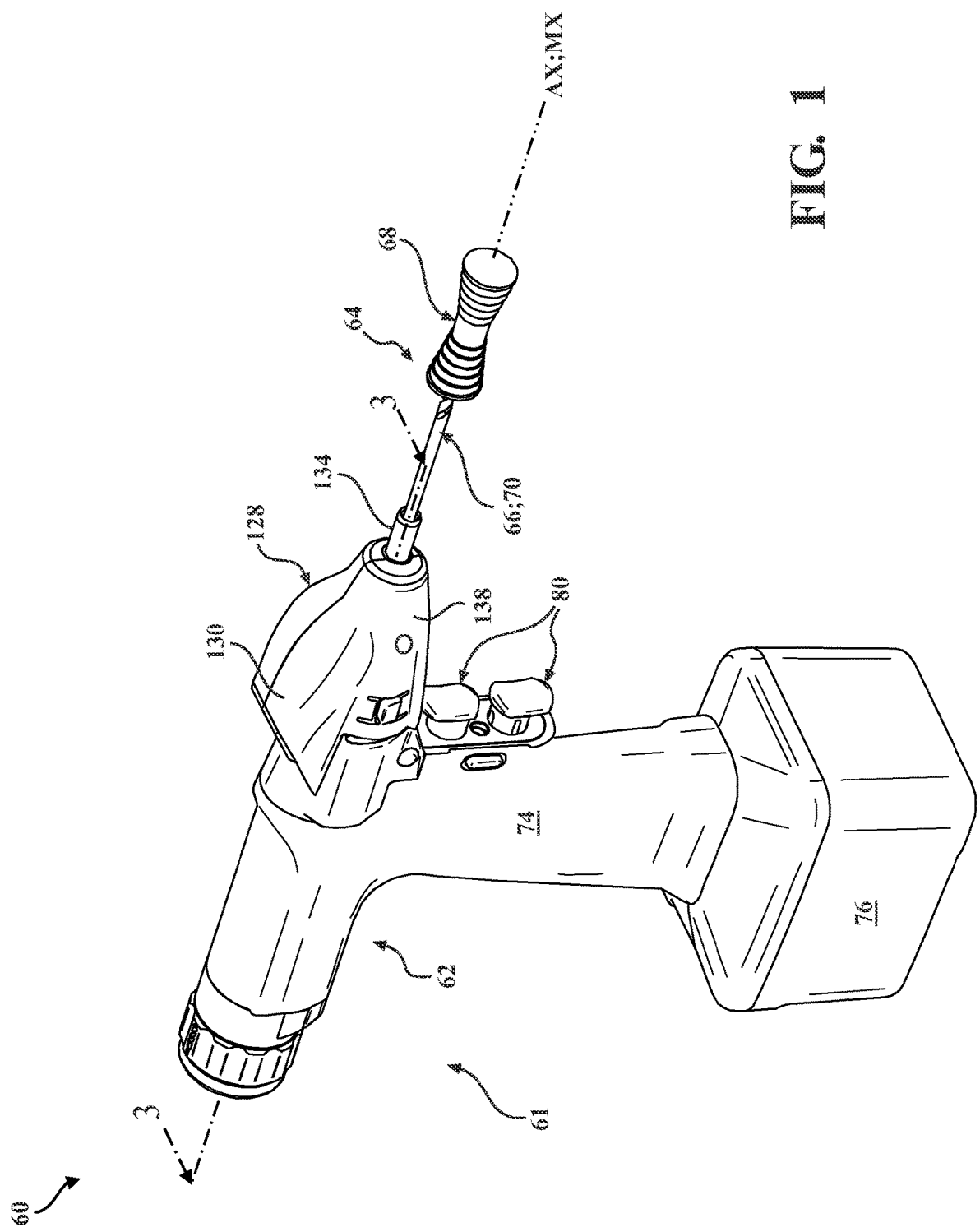
FIG. 1 is perspective view of a surgical system comprising a surgical instrument and end effector, the end effector shown having a drill bit having an identification feature and a tip protector according to one configuration.

With the scope of the invention defined by the claims and clauses included herein without limiting effect of the Summary, the present disclosure is directed to a surgical system for cutting into a bone with a cutting tool. The surgical system includes a sensor configured to output one or more displacement signals associated with a displacement of the cutting tool during a cutting process and a controller. The controller is configured to determine displacement data of the cutting tool relative to the bone from an initial cutting time and a final cutting time. The displacement data includes a displacement value indicative of a proximal surface of a proximal cortex of a bone and a displacement value indicative of a distal surface of a distal cortex of the bone. The controller is also configured to receive a proximal cortex threshold value or optionally have a proximal cortex threshold value stored in memory of the controller. The proximal cortex threshold value may be indicative of a displacement value that is distal the proximal cortex, and proximal the distal cortex. The controller is further configured to determine distal cortex acceleration data based on the displacement data and to determine a breakthrough depth of a bore based on the distal cortex acceleration data that is solely distal the proximal cortex threshold value.

Therefore, according to a first aspect of the present disclosure, the surgical system includes a first sensor configured to output one or more displacement signals associated with a displacement of the cutting tool during a cutting process and a controller. The controller is configured to determine displacement data of the cutting tool relative to the bone from an initial cutting time and a final cutting time. The displacement data includes a displacement value indicative of a proximal surface of a proximal cortex of a bone and a displacement value indicative of a distal surface of a distal cortex of the bone. The controller is also configured to receive a proximal cortex threshold value. The proximal cortex threshold value is indicative of a displacement value that is distal the proximal cortex, and proximal the distal cortex. The controller is further configured to determine distal cortex acceleration data based on the displacement data and to determine a breakthrough depth of a bore based on the distal cortex acceleration data that is solely distal the proximal cortex threshold value.

In certain implementations, the surgical system may also include an instrument having a housing and a motor positioned in the housing. The motor may be configured to apply rotational torque to a cutting tool during a cutting process. The cutting tool may be a drill bit and the cutting process may be a drilling process. The surgical system may include a user input device configured to receive a bone type from a user. The surgical system may include a measurement module configured to measure displacement of the cutting tool during the cutting process. The measurement module may be coupled to the housing. The user input device may be separate and remote from the instrument and the measurement module. The user input device may be a tablet, a smartphone, or a console. The instrument may include second sensor. The second sensor may be configured to determine a performance feature of the cutting tool based on an identification feature of the cutting tool. The controller may include a memory unit. The memory unit may store a look-up table with performance features of the cutting tool correlated to cutting tool identification features. The surgical system may include a device for determining a plate offset of a bone plate used in a surgical procedure. The first sensor may be coupled to the measurement module. The first sensor may be an optical displacement sensor. The cutting tool may include a blade, a bur, a saw, a rasp, a mill, a reamer, or a trocar pin. The controller may further include a memory unit. The memory unit may store the proximal cortex threshold value. The system may include at least two drill bits. Each of the at least two drill bits has a different performance feature. The system may be configured to utilize the same proximal cortex threshold value for each of the at least two drill bits.

According to a second aspect of the present disclosure, the surgical system includes a first sensor configured to output one or more displacement signals associated with a displacement of the cutting tool during a cutting process. The surgical system also includes a controller configured to determine a proximal cortex acceleration event value of the cutting tool after the cutting tool advances to a depth corresponding to a depth threshold value. The controller is also configured to determine a proximal cortex acceleration event depth value based on a time at which the proximal cortex acceleration event value occurs. The controller is also configured to determine a plunging speed value of the cutting tool after the cutting tool advances from a reference point to the depth corresponding to the proximal cortex acceleration event depth value. The plunging speed value is based on a velocity of the cutting tool from the reference point to the depth corresponding to the proximal cortex acceleration event depth value. The controller is also configured to determining a bone hardness factor based on the proximal cortex acceleration event value and the plunging speed value, and determine a breakthrough depth of a bore based on the bone hardness factor.

In certain implementations, the surgical system may include an instrument and a measurement module configured to be coupled to the instrument. The measurement module may include the first sensor configured to output one or more displacement signals associated with a displacement of the cutting tool. The surgical system may include second sensor. The instrument may include a motor configured to receive electrical current to apply rotational torque to the cutting tool during a cutting process. The second sensor may be configured to generate signals responsive to electrical current supplied to the motor of the instrument. The controller may be configured to determine a torque of the motor based on an output of the second sensor. The instrument may include an instrument housing. The measurement module may include an attachment housing. The second sensor and the controller may be disposed in the instrument housing and the first sensor may be disposed in the attachment housing.

A third aspect of the present disclosure is directed to a method of determining a breakthrough depth of a bore formed in a bone by a cutting tool. The surgical system of the first aspect of the present disclosure, and optionally, any of its corresponding implementations may be used to perform the method according to the third aspect. Displacement data of the cutting tool relative to the bone from an initial cutting time and a final cutting time is determined. The displacement data includes a displacement value indicative of a proximal surface of a proximal cortex of a bone and a displacement value indicative of a distal surface of a distal cortex of the bone. A proximal cortex threshold value is provided. The proximal cortex threshold value is indicative of a displacement value that is distal the proximal cortex, and is proximal the distal cortex. Distal cortex acceleration data is determined based on the displacement data. Breakthrough depth of the bore is determined based on the distal cortex acceleration data that is solely distal the proximal cortex threshold value.

In certain implementations, the proximal cortex threshold value may be adjusted based on a performance feature of the cutting tool. The performance feature of the cutting tool may be determined based on an identification feature of the cutting tool. The cutting tool identification feature may be compared with a look-up table stored in memory and the performance feature of the cutting tool may be determined based on the look-up table and the cutting tool identification feature. The proximal cortex threshold value may be adjusted based on a bone type cut by the cutting tool. A plate offset and the bone type cut by the cutting tool may be determined based on the plate offset. A bone plate or screw may be selected for use in a surgical procedure. The plate offset may be determined based on the bone plate or screw selected for use in the surgical procedure. One or more acceleration events may be determined based on the distal cortex acceleration data. Breakthrough depth may be determined based on the one or more acceleration events and an acceleration event threshold. The acceleration event threshold may be based on a performance feature of the cutting tool or a bone type. Each of the one or more acceleration events may be based on the distal cortex acceleration data that is solely distal the proximal cortex threshold value. Each of the one or more acceleration events may be based on an acceleration over a time interval. The time interval may be a portion of a time period corresponding to the displacement data that is solely distal the proximal cortex threshold value. The time interval may be based on a performance feature of the cutting tool or a bone type.

A fourth aspect of the present disclosure is directed to a method of determining a breakthrough depth of a bore formed in a bone by a cutting tool attached to a cutting instrument. A bone type to be cut is determined. A depth threshold value is set based on the bone type to be cut. Displacement data is determined based on displacement of the cutting tool as the cutting tool advances from a reference point into the bone to form the bore. The displacement data and time data corresponding to the displacement data is stored in a memory unit. Acceleration data is determined based on the displacement data. A proximal cortex acceleration event is determined to have occurred based on the acceleration data after the cutting tool advances into a proximal cortex of the bone to a depth corresponding to the depth threshold value. A proximal cortex acceleration event value of the cutting tool is determined based on the acceleration data. A proximal cortex acceleration event depth value is determined based on the time at which the proximal cortex acceleration event occurs. A plunging speed value of the cutting tool is determined. A bone hardness factor is determined based on the proximal cortex acceleration event value and the plunging speed value. The breakthrough depth of a full formed bore is determined based on the bone hardness factor and the displacement data.

In certain implementations, the depth threshold value is based on an average proximal cortex thickness for a particular bone type. The plunging speed may be determined after the cutting tool advances from the reference point to the depth corresponding to the proximal cortex acceleration event depth value. The plunging speed value may be based on a velocity of the cutting tool from the reference point to the depth corresponding to the proximal cortex acceleration event depth value. The plunging speed value may be based on an average velocity of the cutting tool from the reference point to the displacement data corresponding to the proximal cortex acceleration event depth value. A drilling thickness value may be based on the displacement data of the cutting tool that corresponds to the proximal cortex acceleration event value. A drilling time value may be based on time data that corresponds to the proximal cortex acceleration event value. The plunging speed value may be based on the drilling thickness value and the drilling time value. A rotational speed value of the cutting tool may be determined. The bone hardness factor may be based on the rotational speed value of the cutting tool, the proximal cortex acceleration event value, and the plunging speed value. The rotational speed value of the cutting tool may be determined between a time period from the time corresponding to where the cutting tool is at the reference point and the time corresponding to where the cutting tools is at the depth at which the proximal cortex acceleration event depth value occurs. A torque of the cutting tool is determined. The bone hardness factor may be based on the torque of the cutting tool as the cutting tool advances from the reference point to the depth corresponding to the proximal cortex acceleration event depth value, the proximal cortex acceleration event value, and the plunging speed value. An electrical current may be supplied to a motor of the cutting instrument. The torque may be determined based on the measured electrical current supplied to the motor of the cutting instrument. The bone type to be cut may be determined based on identification of a performance feature of the cutting tool. The performance feature of the cutting tool may be determined based on identification of an identification feature of the cutting tool and a sensor located in the cutting instrument. The cutting tool identification feature may be compared with a look-up table stored in memory. The performance feature of the cutting tool may be determined based on the look-up table and the cutting tool identification feature. A plate offset and a bone type to be cut by the cutting tool may be based on the plate offset. A particular bone plate or screw may be selected for use in a surgical procedure. The plate offset may be based on the particular bone plate or screw selected for use in the surgical procedure. A particular bone plate or screw selected for us in a surgical procedure may be determined by inserting the screw into a calibration device. A breakthrough depth of the full bore may be based on the acceleration data solely distal the depth threshold value. One or more distal cortex acceleration events may be based on the acceleration data distal the depth threshold value. The breakthrough depth may be based on the one or more distal cortex acceleration events and a distal cortex acceleration event threshold. The distal cortex acceleration event threshold may be based on the bone hardness factor. The distal cortex acceleration event threshold may include a numerical value that is based on the acceleration data. The numerical value may be set higher for bone hardness factor corresponding to harder bone and lower for bone hardness factor corresponding to softer bone. Each of the one or more distal cortex acceleration events may be based on an acceleration over a time interval. The time interval may be a portion of a time period corresponding to the displacement data that is solely distal the depth threshold value. The time interval may be based on the bone hardness factor.

A fifth aspect of the present disclosure provides a method of determining a breakthrough depth of a bore formed in a bone by a cutting tool attached to a cutting instrument. Displacement data of the cutting tool is determined. Bone type to be cut is determined. A bone hardness factor is determined. The breakthrough depth of a fully formed bore is determined based on the bone hardness factor and the displacement data.

DETAILED DESCRIPTION

Figure 2:
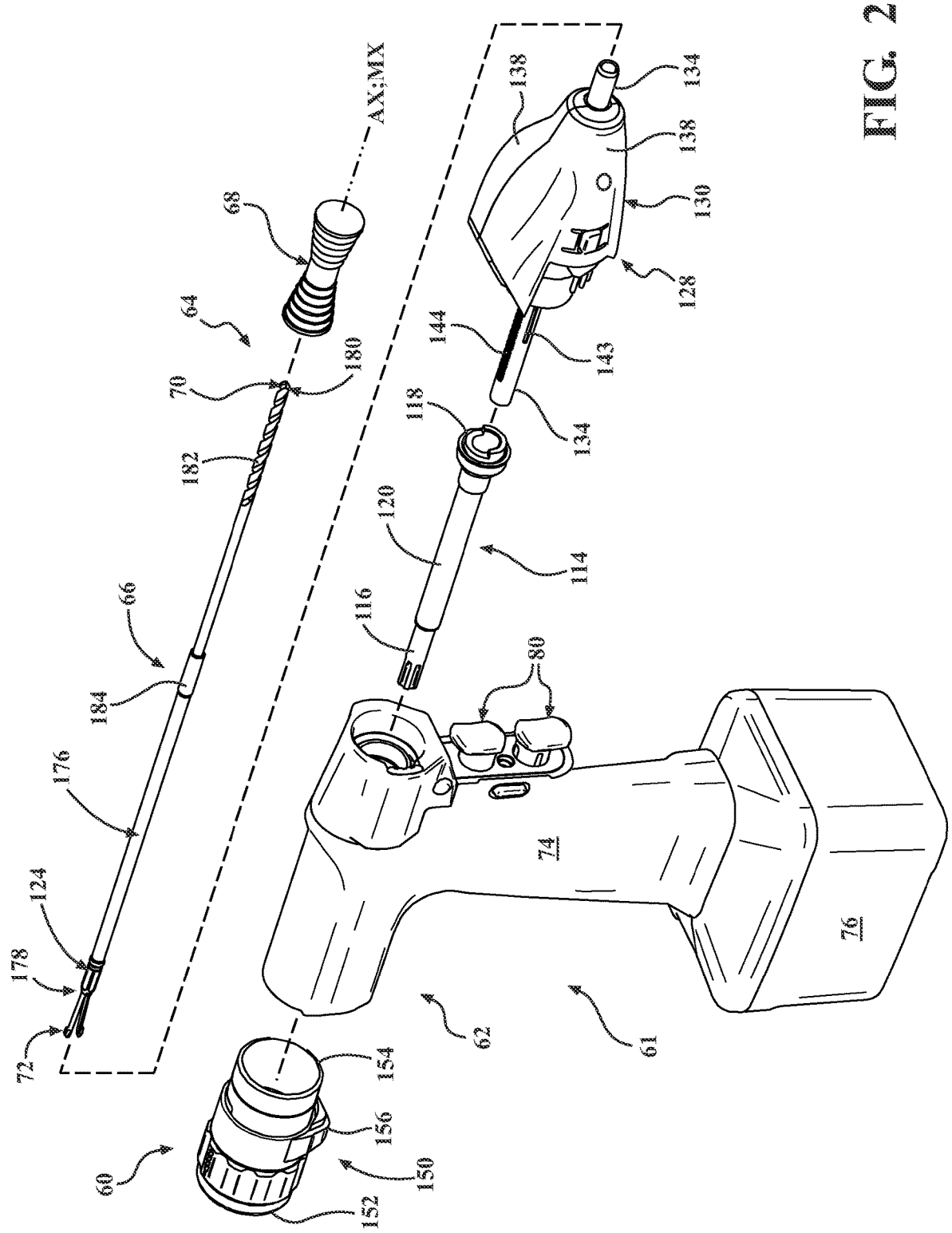
FIG. 2 is a partially exploded perspective view of the surgical system of FIG. 1, with the surgical instrument shown having a measurement module, a drive assembly, and a release mechanism spaced from a handpiece body, and with the end effector removed from the surgical instrument and shown with the tip protector spaced from a distal cutting tip portion of the drill bit.

With reference to the drawings, where like numerals are used to designate like structure throughout the several views, a surgical system, or surgical drill system, is shown at 60 in FIGS. 1-2 for performing an operational function that is typically associated with medical and/or surgical procedures. In some configurations the surgical drill system 60 may also be referred to as a surgical handpiece system. In the representative configuration illustrated herein, the surgical drill system 60 is employed to facilitate penetrating a workpiece, such as tissue or bone of a patient. As used herein, unless otherwise indicated, the term workpiece is understood to alternatively refer to tissue and/or bone. To this end, the illustrated configuration of the surgical drill system 60 comprises a surgical drill 61 that comprises a handpiece 62, alternatively referred to as a handheld surgical cutting instrument 62 or sometimes a cutting instrument 62, and an end effector, generally indicated at 64, coupled to the handpiece 62. The end effector 64, in turn, comprises a cutting tool such as a drill bit 66 and may also include a tip protector 68.

As is best depicted in FIG. 2, the drill bit 66, when respectively coupled to the handpiece 62, extends generally longitudinally along an axis AX (i.e., the longitudinal axis AX or axis AX) between a cutting tip portion, generally indicated at 70, and an insertion portion, generally indicated at 72. The cutting tip portion 70 is configured to engage the workpiece, and the insertion portion 72 is configured to facilitate releasable attachment of the drill bit 66 to the handpiece 62. Various configurations of the insertion portion are contemplated to enable coupling of the drill bit 66 to the handpiece 62, such as various grooves, slots, and other geometries. One exemplary configuration of an insertion portion can be found in U.S. Pat. No. 10,159,495, issued Dec. 25, 2018, which is hereby incorporated by reference in its entirety. It is contemplated that there may be other configurations to facilitate attachment of the drill bit 66 to the handpiece 62.

As also shown in FIG. 2, the drill bit extends along the axis AX from a proximal end to a distal end. The drill bit 66 comprises a shank, generally indicated at 176, which extends along the axis AX between a proximal end 178 and a distal end 180. A distal portion of the shank 176 adjacent the distal end 180 of the shank 176 may define flutes 182 which may be helically disposed about the axis AX and extend to the cutting tip portion 70 of the drill bit 66 to promote workpiece, such as tissue, penetration (See FIG. 2). In the illustrated configuration, the drill bit 66 may also be provided with a bearing region 184 coupled to the shank 176 between the proximal end 178 and the distal end 180. In many configurations the bearing region 184 is integral with the shank 176. The bearing region 184 is sized so as to be received within and rotate relative to a depth measurement extension 134 of a measurement module 128 that may be coupled to the handpiece (discussed in greater detail further below). Here, the bearing region 184 may define a "stepped" outer region of the shank 176 that affords rotational support along the length of the drill bit 66, and may have a larger diameter than adjacent distal and proximal regions of the shank 176 in the illustrated configuration. However, it will be appreciated that the bearing region 184 of the shank 176 of the drill bit 66 could be configured in other ways without departing from the scope of the present disclosure. Furthermore, while described as a drill bit 66 in the present disclosure, it is also contemplated that the cutting tool could have similar features and be configured as another suitable end effector, or rotary end-effector, such as a bur, a saw, a rasp, a mill, a reamer, a blade or a trocar pin (e.g., a Steinmann Pin or a K-wire pin).

FIGS. 1-4 illustrates the drill bit 66 having one configuration of performance features. It is contemplated that other drill bits that could be coupled to the surgical handpiece 62 could be different from the illustrated drill bit 66 in one or more performance features. It is also contemplated that other cutting tools may have similar performance features or performance features distinct from drill bits. More specifically to drill bits, the illustrated drill bit in FIGS. 1-4 could differ from other suitable drill bits in performance features such as a radius, a cutting tip geometry, a material, a length, a cross-sectional area, a drill bit type, a cutting efficiency, a rake angle, a flute angle, a flute depth, a point angle, another feature of the drill bit 66, or combinations thereof. These differing performance features or characteristics may result in a variation in the performance of the surgical drill system 60 during use depending on which of the drill bits 66 is used. To aid the operator in determining which drill bit 66 is coupled to the handpiece 62, an identification feature 177 may be included on the drill bit 66 to identify the respective drill bit 66 and its performance features. The identification feature 177 is correlated to the performance features associated with each type of drill bit 66 or end effector 64. Associated therewith, the operator can more precisely control operation of the surgical drill 61 for drilling a bore based upon knowledge gained from the identification feature 177 regarding the coupled drill bit 66. Examples of configurations of drill bits having different performance features and drill bit identification are described, for example, in International Patent Application No. PCT/US2020/033288, filed on May 15, 2020 and entitled "Powered Surgical Drill Having Rotating Field Bit Identification", the contents of which are herein incorporated by reference in their entirety.

Referring now to FIGS. 1-4, in the representative configuration illustrated herein, the surgical handpiece assembly 62 is realized as a handheld drill with a pistol-grip shaped handpiece housing assembly 74 which releasably attaches to a battery 76 (battery attachment not shown in detail). In some configurations, the handpiece housing assembly 74 may be referred to as an instrument housing. However, it is contemplated that the handpiece housing assembly 74 can have any suitable shape with or without a pistol grip. While the illustrated surgical handpiece assembly 62 employs a battery 76 which is releasably attachable to the handpiece housing assembly 74 to provide power to the surgical handpiece assembly 62 utilized to rotate the drill bit 66, it will be appreciated that the surgical handpiece assembly 62 may be configured in other ways, such as with an internal (e.g., non-removable) battery, or with a tethered connection to an external console, power supply, and the like. Other configurations are contemplated.

In the illustrated configuration, the battery 76 or other power source provides power to a controller 78 (depicted schematically in FIG. 4) which, in turn, is disposed in communication with an input control 80 and an actuator assembly 82. The user input device 80 and the actuator assembly 82 are each supported by the handpiece housing assembly 74. The controller 78 is generally configured to facilitate operation of the actuator assembly 82 in response to actuation of the input control 80. The input control 80 is shown as a trigger-style configuration in the illustrated configuration, is responsive to actuation by a user (e.g., a surgeon), and communicates with the controller 78, such as via electrical signals produced by magneto-resistive sensors (e.g., Hall effect sensors) and magnets. Thus, when the surgeon actuates the input control 80 to operate the surgical handpiece assembly 62, the controller 78 directs power from the battery 76 to the actuator assembly 82 which, in turn, generates rotational torque employed to rotate the drill bit 66. Those having ordinary skill in the art will appreciate that the handpiece housing assembly 74, the battery 76, the controller 78, and the input control 80 could each be configured in a number of different ways to facilitate generating rotational torque without departing from the scope of the present disclosure.

Figure 3:
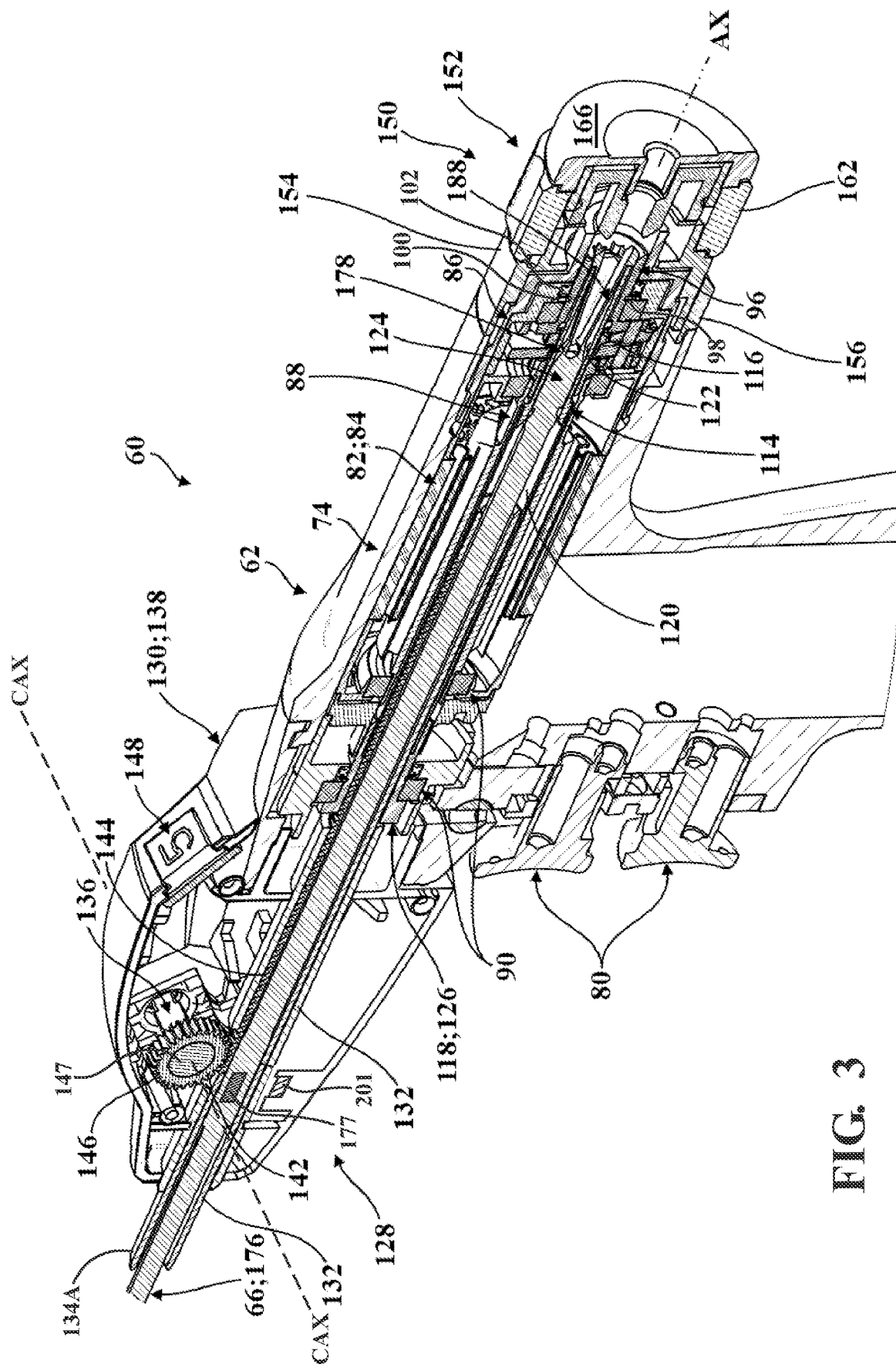
FIG. 3 is a partial isometric sectional view taken along line 3-3 in FIG. 1 illustrating the arrangement of the identification feature and the sensor located within the measurement module.

As also shown in FIG. 3, the actuator assembly 82 may comprise an electric motor 84 and a gearset 86 which are each supported within the handpiece body 74. The motor 84 is configured to selectively generate rotational torque in response to commands, signals, and the like received from the controller 78. As is best shown in FIG. 5, the motor 84 comprises a rotor cannula 88 supported for rotation about the axis AX by a pair of bearings 90. A drive gear arranged adjacent to the gearset 86 is coupled to and rotates concurrently with the rotor cannula 88, and is employed to transmit rotational torque to the gearset 86. To this end, in the illustrated configuration, the gearset 86 is realized as two-stage compound planetary arrangement and generally comprises a ring gear housing 94 which, among other things, rotationally supports an output hub 96 via a bearing 90, as well as one or more retaining clips 98, washers 100, and/or seals 102. However, other configurations of the gearset 86 are contemplated.

Further details of one configuration of a gearset 86 are described, for example, in U.S. Pat. No. 10,159,495, issued Dec. 25, 2018, and entitled "Drill Bit for Handheld Surgical Instrument", the contents of which are herein incorporated by reference in their entirety, and describe wherein the rotation of the drive gear via actuation of the motor 84 effects concurrent rotation of the output hub 96, and wherein the output hub 96 rotates concurrently with the drill bit 66. The actuator assembly 82 could be configured in other ways without departing from the scope of the present disclosure. By way of non-limiting example, while the illustrated actuator assembly 82 employs a compound planetary arrangement to adjust rotational speed and torque between the drive gear of the motor 84 and the output hub 96, other types of gearsets 86 could be utilized in some configurations. Moreover, while the illustrated actuator assembly 82 employs an electrically powered brushless DC motor to generate rotational torque, other types of prime movers could be utilized. Other configurations are contemplated.

Figure 4:
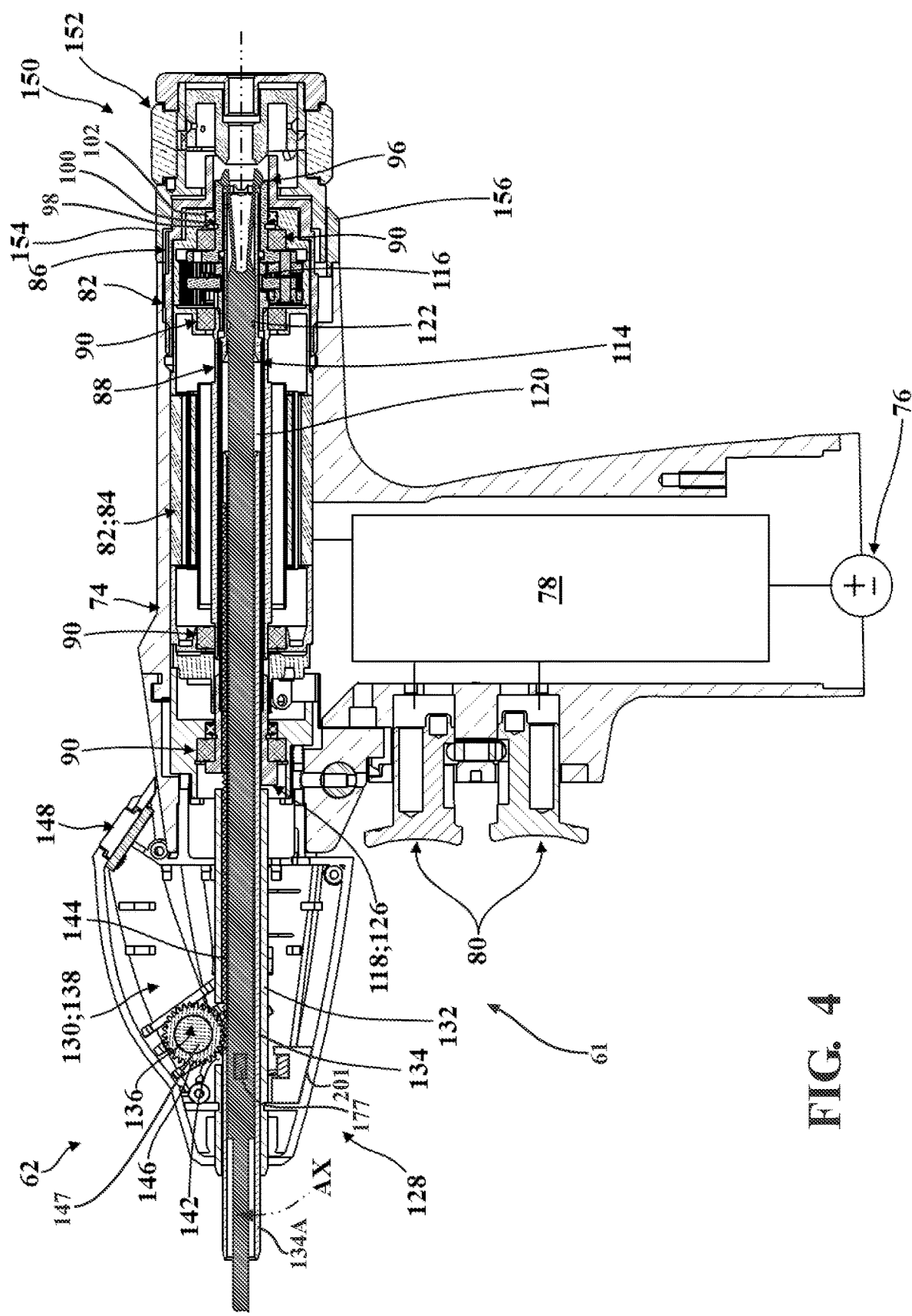
FIG. 4 is a sectional view taken longitudinally through the surgical instrument of FIGS. 1-4 illustrating the arrangement of the identification feature and the sensor located within the measurement module.

As noted above, rotational torque generated by the motor 84 effects rotation of the output hub 96 which, in turn, rotates concurrently with the coupled drill bit 66. To this end, and as is best shown in FIGS. 2-4, the handpiece 62 further comprises a drive assembly 114 which generally extends through the various cannulated components of the actuator assembly 82 into splined engagement with the output hub 96 of the gearset 86. The drive assembly 114 is configured to facilitate releasable attachment between the drill bit 66 and the handpiece 62. The drive assembly 114 generally comprises a driving cannula 116, a driving head 118, and a driving body 120 which extends between, and rotates concurrently with, the driving cannula 116 and the driving head 118. The drive assembly 114 is supported for rotation about the axis AX within the handpiece body 74 via splined engagement with the output hub 96 adjacent the driving cannula 116, and via an arrangement of bearings, washers, and seals adjacent the driving head 118. It is contemplated that the drill bit 66 may be configured to attach to the handpiece 62 to receive torque in a manner different from that described above.

Further details of the drive assembly 114 are also described, for example, in U.S. Pat. No. 10,159,495. In the illustrated configuration, the driving head 118 of the drive assembly 114 comprises a coupling, generally indicated at 126, which is provided to facilitate transmitting rotational torque when the handpiece 62 is utilized in connection with other applications besides rotating the drill bit 66 of the present disclosure. More specifically, the illustrated drive assembly 114 is configured such that the handpiece 62 can rotate, drive, or otherwise actuate a number of different types of surgical instruments, tools, modules, end effectors, and the like, which can be configured to engage and rotate concurrently with either the bore 122 of the driving cannula 116, or the coupling 126 of the driving head 118. It will be appreciated that this configuration allows the same handpiece 62 to be utilized in a broad number of medical and/or surgical procedures. However, it is contemplated that the drive assembly 114 could be configured differently in some configurations, such as to omit a driving head 118 with a coupling 126 in configurations where the handpiece 62 configured for dedicated use with the drill bit 66 of the present disclosure.

Referring back to FIGS. 1-3, the illustrated configuration of the handpiece 62 further comprises a release mechanism, or coupling mechanism, generally indicated at 150, configured to facilitate removal of the drill bit 66. The coupling mechanism 150 generally comprises a release subassembly 152, a keeper body 154, and a housing adapter 156. The keeper body 154 and the housing adapter 156 are respectively configured to secure the release subassembly 152 to the actuator assembly 82 and the handpiece body 74, and could be realized with a number of different configurations or could be integrated into other parts of the handpiece 62 in some configurations.

As noted above, the drill bit 66 generally extends along the axis AX between the cutting tip portion 70 and the insertion portion 72, and is configured for releasable attachment to the handpiece 62 described herein and illustrated throughout the drawings via engagement between the interface 124 of the drill bit 66 and the bore 122 of the driving cannula 116 of the drive assembly 114. The driving cannula 116, in turn, cooperates with the output hub 96 of the gearset 86 of the actuator assembly 82 to facilitate rotating the drill bit 66 about the axis AX.

The illustrated configuration of the surgical drill system 60 further comprises the measurement module (alternatively referred to sometimes as a measurement head), generally indicated at 128, which may be configured to releasably attach to the handpiece 62 to provide the surgeon with measurement functionality during use. To this end, and as is best shown in FIGS. 4 and 5, the measurement module 128 may generally comprise a housing 130, a guide bushing 132, and a depth measurement extension 134 (i.e., a measurement probe, or measurement cannula), which includes a distal end 134A adapted for placement against a workpiece 62, or tissue. Suitable examples of a measurement module are described in International Patent Application No. PCT/IB2018/056251, which is hereby incorporated by reference in its entirety. The housing 130 may be releasably attachable to the handpiece 62 and generally support the various components of the measurement module 128. The illustrated housing 130 may be formed as a pair of housing components 138 which interlock or otherwise attach, and may be configured for disassembly to facilitate cleaning or servicing the measurement module 128. It should be appreciated that the measurement module 128 may be formed as an integral component of the handpiece 62, or may be in the form of a component that is affixed or otherwise secured to the handpiece 62 in a manner wherein the measurement module 128 is not removable from the handpiece 62 after use.

In the illustrated configuration, the housing components 138 and the guide bushing 132 comprise correspondingly shaped features arranged to prevent relative axial and rotational movement therebetween, such as via notches formed in the guide bushing 132 which fit into webs or ribs formed in the housing components (not shown in detail). The guide bushing 132 may further comprises a window 142 as described in detail below.

The depth measurement extension 134 may be disposed within the guide bushing 132 and is supported for translational movement along the axis AX relative to the handpiece 62. An elongated recessed slot 143 (partially depicted in FIG. 2) may be formed transversely into the depth measurement extension 134 and extends longitudinally. While not specifically illustrated herein, the elongated recessed slot 143 may be shaped and arranged to receive a travel stop element which, in turn, is supported by the housing 130 and likewise extends through an aperture formed transversely through the side of the guide bushing 132. This arrangement may serve to limit how far the depth measurement extension 134 may be axially extended or retracted relative to the guide bushing 132 and housing 130, and may also prevent the depth measurement extension 134 from rotating about the axis AX. However, it will be appreciated that the measurement module 128 could be configured to limit or prevent movement of the depth measurement extension 134 in other ways without departing from the scope of the present disclosure.

As illustrated, the depth measurement extension 134 further comprises rack teeth 144 which are disposed in meshed engagement with a gear 146 of a transducer assembly 136. As shown in FIG. 5, the window 142 of the guide bushing 132 is arranged adjacent to the transducer assembly 136 to facilitate the meshed engagement between the rack teeth 144 and the gear 146. The gear 146 includes a shaft portion 147 extending along a common gear axis CAX. The gear 146 itself is rotatable 360 degrees about the common gear axis CAX as the probe 134 moves along the axis AX relative to the housing 130.

The transducer assembly 136 is responsive to rotation of the gear 146 resulting from axial movement of the measurement probe 134 in order to generate electrical signals (i.e., a transducer signal) representing changes in the position of the measurement probe 134 relative to the housing 130 along the axis AX, which correspond to the relative positioning of the distal end 134A of the depth measurement extension 134 relative to the housing 130 when the surgical drill 61 is placed against the workpiece. Thus, it will be appreciated that the transducer assembly 136 is able to provide the surgical instrument 62 with enhanced functionality. By way of example, in some configurations, the transducer assembly 136 may be disposed in communication with the controller 78, which may be configured to interrupt or adjust how the motor 84 is driven based on movement of the measurement probe 134, such as to slow rotation of the drill bit 66 at a specific drilling depth into the workpiece. The transducer assembly 136 may also be disposed in communication with an output device 148, such as a display screen, one or more light-emitting diodes (LEDs), and the like, to provide the surgeon with information relating to movement of the measurement probe 134, such as to display a real-time drilling depth, a recorded historical maximum drilling depth, and the like. Other configurations are contemplated. The output device 148 may be part of the measurement module that is removable. Further, while the transducer assembly 136 and depth measurement extension 134 illustrated in FIG. 4 collectively comprise a rack and pinion design with the rack teeth 144 of the depth measurement extension 134 and the gear 146 of the transducer assembly 136, it is contemplated that the transducer assembly 136 may comprise one or more sensors such as a potentiometer, an optical sensor, and a linear variable displacement transformer to generate transducer signals responsive to displacement of the depth measurement extension 134 relative to the housing 130.

In some configurations, the module housing 130 is releasably attachable to the handpiece housing assembly 74. In other configurations, the measurement module 128 is releasably attached to the surgical handpiece assembly 62 in another manner. In certain configurations, the measurement module 128 may include one or more buttons for controlling a function of the measurement module 128. The module housing 130 generally supports the various components of the measurement module 128. In still other configurations, the surgical handpiece assembly 62 and the measurement module 128 are not releasably attached to each other. Instead, the surgical handpiece assembly 62 and the measurement module 128 may form one integral assembly such that the module housing 130 forms a portion of the handpiece housing assembly 74.

As shown in FIGS. 3 and 4, the surgical drill system 60 may also include a sensor 201 (e.g., a bit identification sensor) that is configured for generating one or more signals (e.g., an identification signal) responsive to the identification feature 177. For example, the sensor 201 may be configured to generate the identification signal responsive to a magnetic field or magnetoresistance generated from the one or more magnets on the drill bit 66 as the drill bit 66 rotates about the axis AX during operation of the surgical drill system 60. The identification signal generated by the sensor 201 corresponds to the received generated signal/magnetic field on the respective drill bit 66 that is coupled to the handpiece 62. The controller 78 is configured to receive and interpret the identification signal, or to receive and interpret the magnetic field signature signal, to identify the coupled drill bit 66. Suitable examples of identification features, identification feature location, sensors, and sensor locations are described, for example, in previously mentioned International Patent Application No. PCT/US2020/033288.

In one configuration shown in FIGS. 3 and 4, the sensor 201 may be coupled to or positioned within the measurement module 128, and in particular coupled to or positioned within the housing 130 of the measurement module 128, in a position in proximity to the identification feature 177 when the drill bit 66 is properly coupled to the handpiece 62.

The controller 78 comprises one or more microprocessors having a memory unit for processing instructions or for processing algorithms stored in memory to carry out the functions described herein. Additionally or alternatively, the controller 78 may comprise one or more microcontrollers, subcontrollers, field programmable gate arrays, systems on a chip, discrete circuitry, and/or other suitable hardware, software, or firmware that is capable of carrying out the functions described herein. For instance, the controller 78 may be disposed in the measurement module 128 and a second controller (e.g., a subcontroller, a processor, etc.) may be disposed in the handpiece 62. The second controller may be configured to generate signals to the motor of the handpiece 62 to operate the motor. More specifically, the second controller may control a relative amount of torque generated by the motor on the basis of the transducer signal and the identification signal received by the first controller 78 in the measurement module 128. The controller 78 may be carried in the handpiece body 74 as illustrated in FIG. 5, or elsewhere in the surgical drill system 60, such as on the measurement head 128 or may be remotely located. Memory may be any memory suitable for storage of data and computer-readable instructions (i.e., readable code). For example, the memory may be a local memory, an external memory, or a cloud-based memory embodied as random access memory (RAM), non-volatile RAM (NVRAM), flash memory, or any other suitable form of memory.

In certain configurations, the controller 78 comprises an internal clock to keep track of time. For example, the internal clock may be a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both. In some configurations, the memory, microprocessors, and microcontroller clock cooperate to send signals to and operate the various components to meet predetermined timing parameters.

The controller 78 is electrically coupled at least to each of the input control 80, actuator assembly 82, drive assembly 114, measurement module 128 (including the transducer assembly 136), and sensor 201 to control the operation of the surgical drill system 60.

In particular, the controller 78 may be configured to receive an identification signal from the sensor 201 generated by the identification feature 177 that is sensed by the sensor 201 when a respective drill bit 66 is coupled to the coupling 126 and the housing 130 and wherein the drill bit 66 is rotating about the axis AX. The microprocessor of the controller 78 includes a memory unit that has been preprogrammed with an algorithm that includes a list of known identification signals, with each member of the list of known identification signals corresponding to a respective one of the one or more drill bits 66 having the unique identification feature 177. Accordingly, when the received identification signal is compared to the list of known identification signals, a match is confirmed. The controller 78 may then control the operation of the surgical drill system 60 on the basis of the identified drill bit 66.

In addition to identifying the coupled drill bit 66, the controller 78 may also be configured to receive a transducer signal, sometimes alternatively referred to as a displacement signal, from the transducer assembly 136 corresponding to the relative positioning of the distal end 134A of the depth measurement extension 134 relative to the housing 130. The controller 78 in turn, is configured to control the transfer of torque from the handpiece 62 to the coupled drill bit 66 to the workpiece on the basis of the identification signal and further on the basis of the received transducer signal.

In particular, the controller 78 may also be configured to determine an acceleration signal based on movement of a depth measurement extension 134, such as the movement of the distal end 134A of the depth measurement extension 134 (as provided herein), corresponding to the received transducer signal, during a time within a first time interval. On the basis of the determined acceleration signal, the controller 78 may be further configured to determine a breakthrough depth of the coupled drill bit 66 through the workpiece. In particular, the controller 78 determines a breakthrough time of the drill bit 66 through the workpiece within the first time interval based on the acceleration signal. From this information, and in conjunction with the received transducer signal and the received identification signal, the controller 78 uses an algorithm to determine a depth of the bore hole i.e., drilling passage, in the workpiece.

A variety of different orthopedic implant sets, which can include screws, plates, nails, or pins along with a depth gauge, may be used from various manufacturers. Plates between implant sets can vary in many attributes including a plate offset. Typically, thicker plates have large plate offsets and are used in surgical procedures, particularly surgical drilling procedures, on large bones (e.g., femur, tibia, humerus, etc.). Conversely, thinner plates have small plate offsets and are used with smaller bones. The identity of the plate or screw selected for the cutting/drilling procedure may be used to indicate to the system 60 which type of bone is being drilled. In order for the system 60 to identify the plate offset, and thus what type of bone is drilled, the surgical handpiece system 60 may store in memory a number of different implant sets having different plates and screws and a calibration device or fixture may be used to identify the particular plate and/screw. Alternatively, the system 60 may comprise a remote device (not shown) having a display. The remote device may be configured to generate signals to and receive signals from the surgical handpiece assembly 62. The remote device may comprise a tablet, a smart phone, a laptop, a console, a workstation, or a desktop computer. One or both the display on surgical handpiece assembly 62 and the display on the remote device may output information related to the drilling procedure.

In one configuration, one or both the surgical handpiece assembly 62 and the remote device comprise a user input device (not shown) for entering or selecting information to the controller 78. The user may enter or select a plate, plate offset, screw, etc. to be used in the drilling procedure. The controller 78 may be configured to determine the plate offset from the entered information. With the plate offset information, the controller 78 may be configured to determine the type of bone to be drilled in the surgical procedure. The controller 78 may then use the determination of the bone type to provide more accurate breakthrough determinations. The type of bone may be output to one or both the display 148 on surgical handpiece assembly 62 and the display on the remote device. It is also contemplated that the functionality and features of the remote device may instead be built into the handpiece assembly 62. Examples of suitable calibration devices and fixtures and suitable remote devices are described in International Patent Publication No. WO 2020/092951, published Nov. 1, 2019, which is hereby incorporated by reference in its entirety.

Referring to FIGS. 5A-6C, the identity of the drill bit 66 may also be used to indicate to the system 60 which type of bone is being drilled. For instance, one performance feature of the cutting tool (e.g., drill bit 66) is the diameter of the cutting tool. Typically, small diameter drill bits 266 (see FIGS. 5A-5C) are used for surgical procedures with small bones 202. Conversely, large diameter drill bits 366 are used for surgical procedures with large bones 302. In one configuration, based on the identification feature 177 of the drill bit 266, the controller 78 may determine the drill bit 266 is configured for small bone drilling, i.e., the distal portion of the drill bit 266 may have a diameter generally of less than or equal to 2 mm (and used for small bones such as the foot or hand, etc.). In another configuration, based on the identification feature 177 of the drill bit 366, the controller 78 may determine that the drill bit 366 is configured for large bone drilling, i.e., the distal portion of the drill bit 366 may have a diameter of greater than or equal to about 3.2 mm (and used for longer bones such as femurs), or is configured for bone drilling at drill bit diameters between 2 and 3.2 mm.

Information relating to bone type may be useful in obtaining more accurate determination of the breakthrough depth of the bore because certain bone types have certain average cortical thicknesses. Certain depth information obtained from displacement signals can be excluded if determined to be outside a range of expected depth information that encompasses the thickness of the type of bone being drilled. The combination of drill bit diameter identity and plate offset identity used in the surgical procedure is particularly advantageous in determining the bone type in the drilling procedure because the overlapping ranges of types of bone encompassed by a particular drill bit diameter and a particular plate offset provide a narrower subset of potential bone types than using either the drill bit diameter or the plate offset alone. Said differently, a particular drill bit diameter may be used for two or more types of bone. A particular plate offset may be used for two or more types of bone, with at least one of the types of bone used for the plate offset being different from a type of bone used for the particular drill bit diameter. The controller 78 may be able to identify the type of bone in a drilling procedure based on the common bone type uses.

Figure 5A:
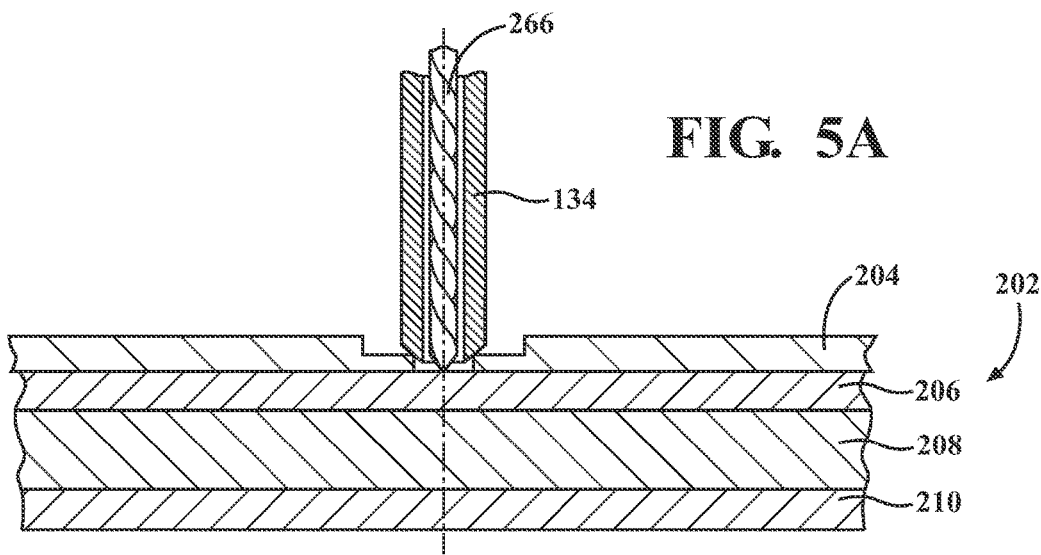
FIG. 5A is a cross-sectional view of a small bone with a drill bit and depth measurement extension in a first position relative to the small bone.
Figure 5B:
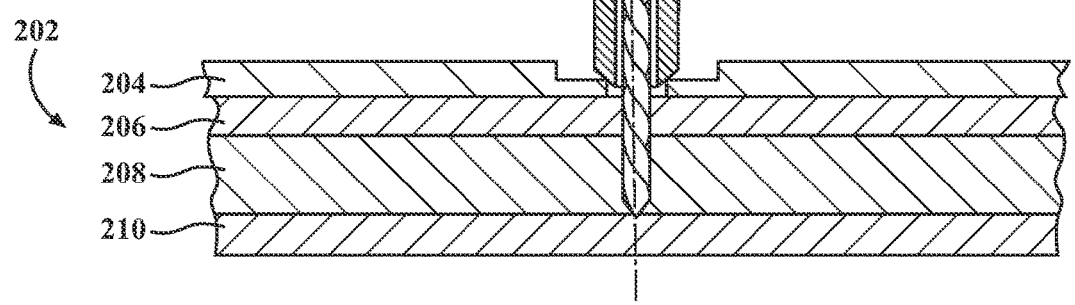
FIG. 5B is a cross-sectional view of the small bone with the drill bit of Figure and depth measurement extension in a second position relative to the small bone.
Figure 5C:
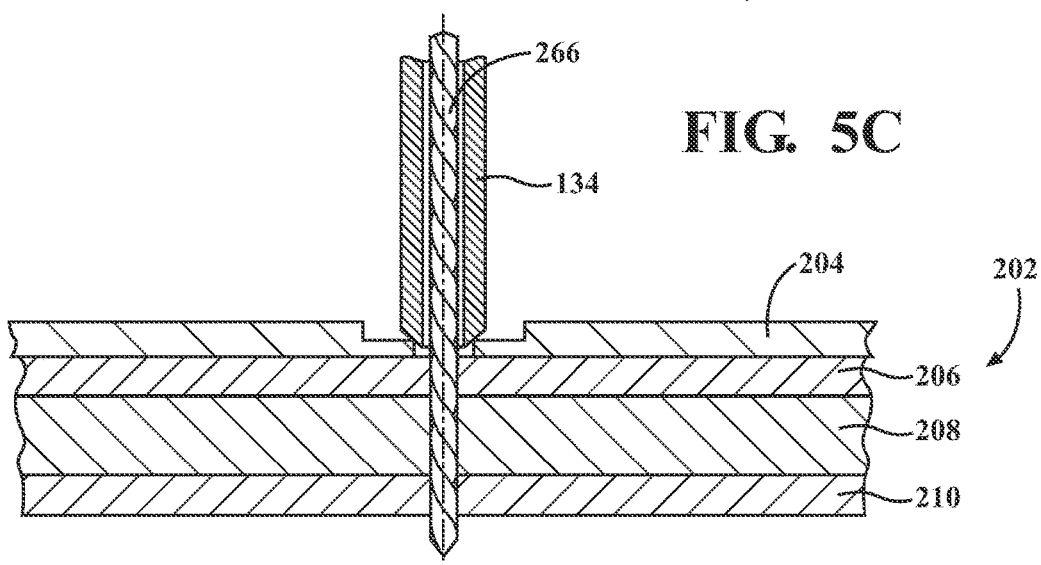
FIG. 5C is a cross-sectional view of the small bone with the drill bit of Figures and depth measurement extension in a third position relative to the small bone.
Figure 6A:
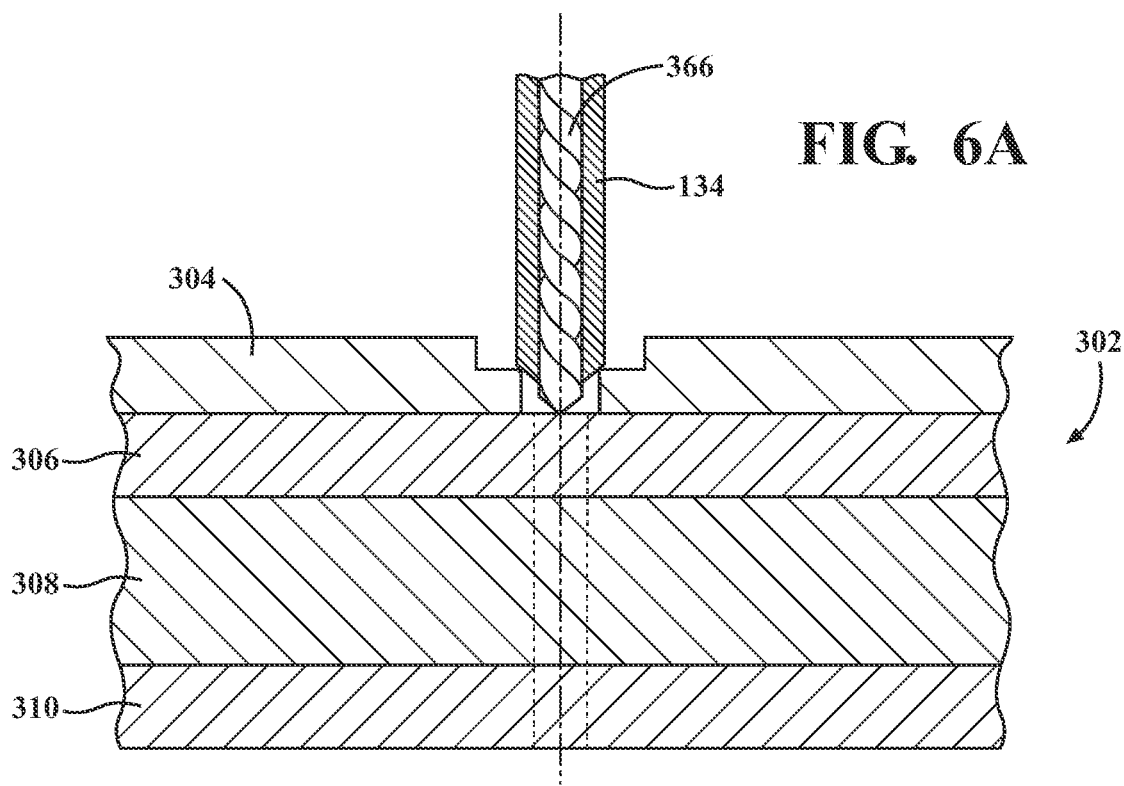
FIG. 6A is a cross-sectional view of a large bone with another drill bit and depth measurement extension in a first position relative to the large bone.
Figure 6B:
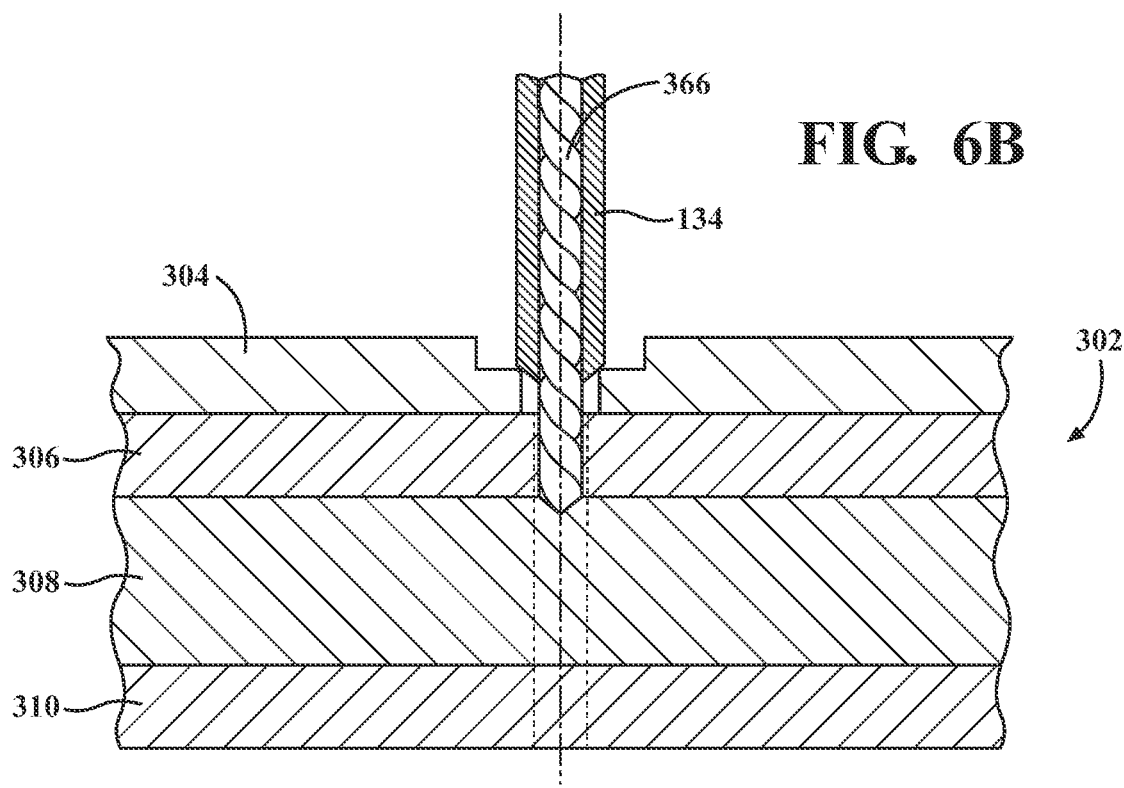
FIG. 6B is a cross-sectional view of the small bone with the drill bit of FIG. 6A and depth measurement extension in a second position relative to the large bone.
Figure 6C:
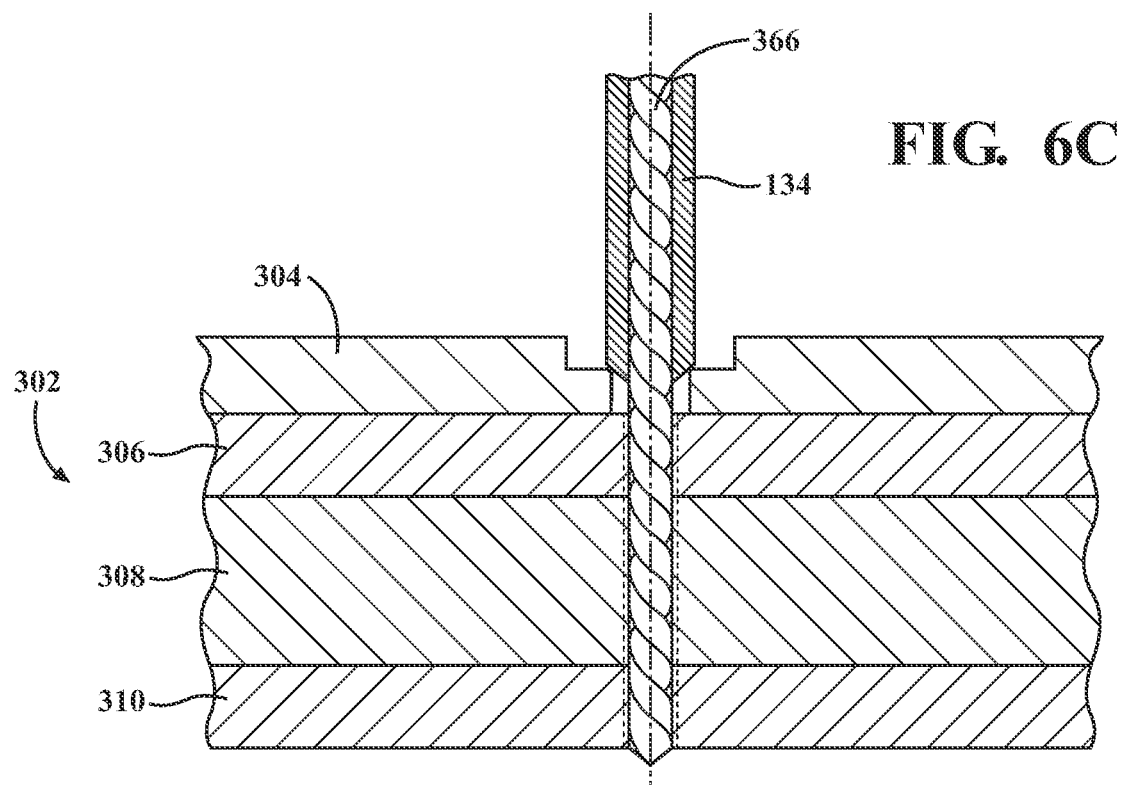
FIG. 6C is a cross-sectional view of the small bone with the drill bit of FIGS. 6A-6B and depth measurement extension in a third position relative to the large bone.
Figure 7:
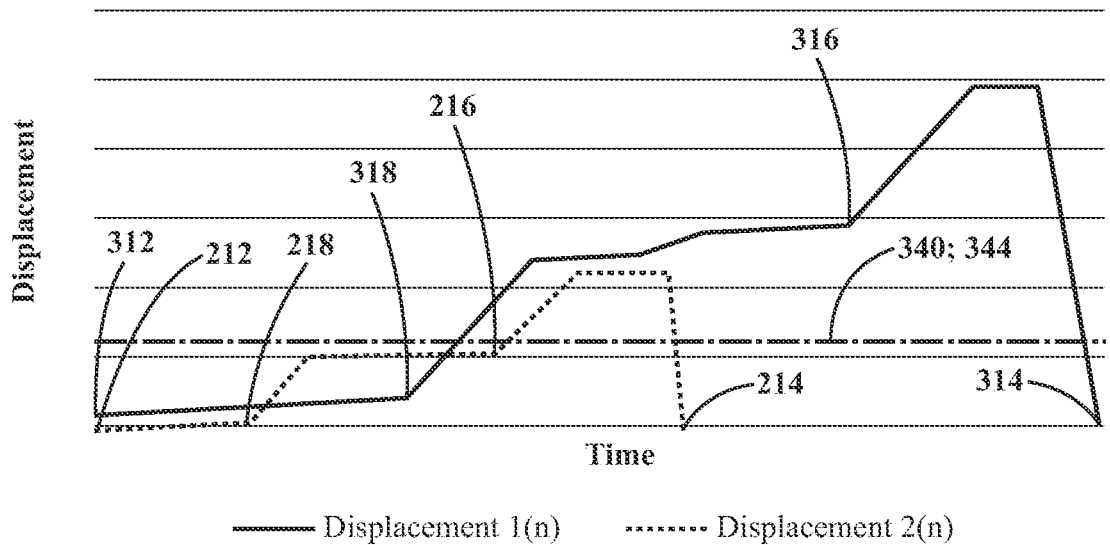
FIG. 7 is a graphical representation of the displacement signal for a drilling process for two types of bones.

In one exemplary configuration illustrated in FIGS. 5A-8, the controller 78 may be configured to more accurately determine the breakthrough depth of the drill bit 266, 366 through a bone 202, 302 based on the type of bone being drilled. FIGS. 5A-5C illustrate a drilling procedure of a relatively small diameter drill bit 266, with a relatively small bone plate 204, on a relatively small bone 202. The small bone comprises a proximal cortical layer of bone 206, a cancellous layer of bone 208, and a distal cortical layer of bone 210. FIGS. 6A-6C illustrate a drilling procedure of a relatively large diameter drill bit 302, with a relatively large bone plate 304, on a relatively large bone 302. The large bone 302 comprises a proximal cortical layer of bone 306, a cancellous layer of bone 308, and a distal cortical layer of bone 310. FIG. 7 illustrates displacement data for the large bone 302, "displacement 1(n)", and displacement data for the small bone 202, "displacement 2(n)". The controller 78 may determine displacement data of the drill bits 266, 366 relative to the bone from an initial drilling time 212, 312 and a final drilling time 214, 314. The displacement data includes a displacement value indicative of a proximal surface of a proximal cortex of a bone and a displacement value indicative of a distal surface of a distal cortex of the bone. The displacement value indicative of a proximal surface of a proximal cortex of a bone is shown at the positions corresponding to the initial drill times 212, 312. The displacement value indicative of a distal surface of a distal cortex of the bone is shown at values corresponding to distal cortex breakthrough 216, 316.

The position of the drill bit 366 relative the large bone 302 in FIG. 5A corresponds with the numerical value at 312 of FIG. 7. In this position the drill bit 366 has not yet been displaced/cut into the bone 302. The position of the drill bit 366 relative the large bone 302 in FIG. 5B corresponds with the proximal cortex breakthrough 318 of FIG. 7. In this position, the drill bit 366 has just broken through the proximal cortical layer of bone 306 and is starting to pass through the cancellous layer of bone 308. The position of the drill bit 366 relative the large bone 302 in FIG. 5C corresponds with the distal cortex breakthrough 316 of FIG. 7. In this position, the drill bit 366 has just broken through the distal cortical layer of bone 310.

The controller 78 may be configured to provide a proximal cortex threshold value 340 indicative of a displacement value that is distal the proximal cortex 318 and proximal the distal cortex 316. The proximal cortex threshold value 340 may be adjusted based on the bone type drilled by the cutting tool 66. The controller 78 may be configured to determine the bone type based on a performance feature of the cutting tool (e.g., cutting tool diameter). As noted above, the performance feature of the cutting tool may be linked to an identification feature 177 of the cutting tool 66. The controller 78 may compare the cutting tool identification feature 177 with a look-up table stored in memory and determine the performance feature—in this example, a cutting tool diameter—based on the look-up table and the cutting tool identification feature 177. In other configurations, the proximal cortex threshold value is defined by a function of a drill characteristic or a performance feature of the cutting tool. In still other configurations, the proximal cortex threshold value is preset and stored in a memory unit of the controller 78 and the same value may be used for cutting tools having different performance features such as drill bits having different diameters.

The controller 78 may also be configured to determine the bone type based on a plate offset. As noted above, the plate offset may be determined by determining the bone plate or screw selected for use in a surgical procedure. The proximal cortex threshold value 340 illustrated in FIG. 7 is for the large bone type 302.

Figure 8:
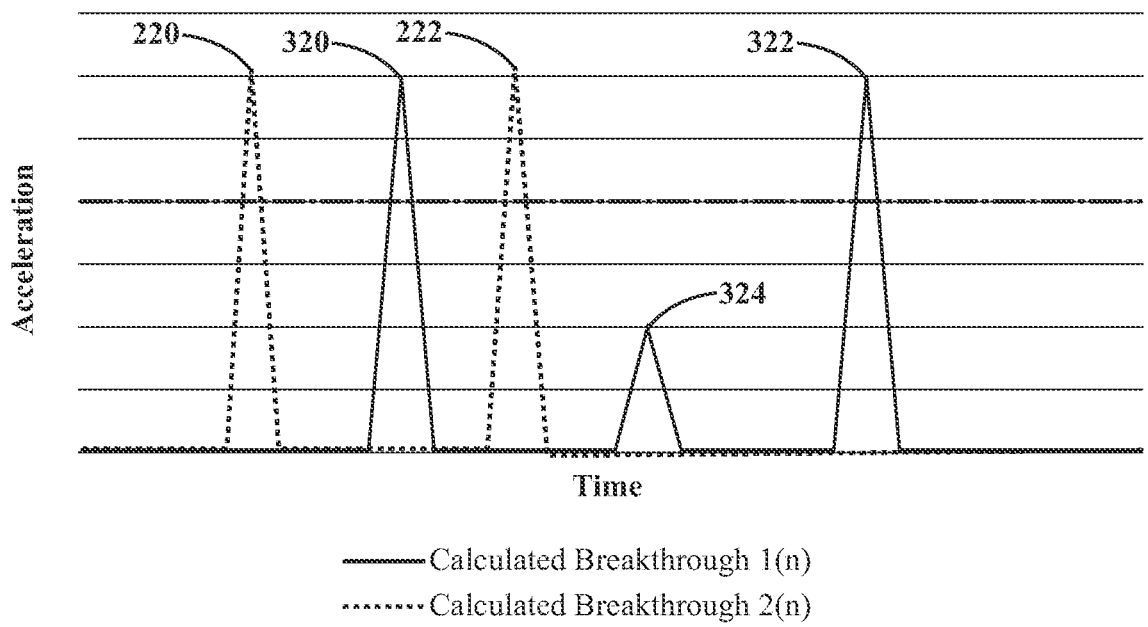
FIG. 8 is a graphical representation of the acceleration signal for a drilling process for two types of bones.

As shown in FIG. 8, acceleration data may be determined from the displacement data illustrated in FIG. 7. In FIG. 8, acceleration events and their values correspond to cortical breakthroughs from the displacement data in FIG. 7. Specifically, the first acceleration event for the small bone type 220 corresponds to the proximal cortex breakthrough 218 and the second acceleration event for the small bone type 222 corresponds to the distal cortex breakthrough 216. Further, the first acceleration event for the large bone type 320 corresponds to the proximal cortex breakthrough 318 and the second acceleration event for the large bone type 322 corresponds to the distal cortex breakthrough 316. The breakthrough depth of the bore may be based on the distal cortex acceleration and displacement data that is solely distal the proximal cortex threshold value 340. More specifically, one or more acceleration events may be determined based on the distal cortex acceleration data. The controller 78 may be configured to determine the breakthrough depth based on the one or more acceleration events and an acceleration event threshold 342 set by the controller 78.

The acceleration event threshold 342 may be based on a performance feature such as the cutting tool diameter or a bone type. The acceleration event threshold 342 may be used to exclude less significant accelerations events 324 from being determined by the controller 78 to be a breakthrough of both the proximal and distal cortical layers of the bone. Each of the one or more acceleration events may be based on the distal cortex acceleration data that is solely distal the proximal cortex threshold value. Each of the one or more acceleration events may be based on an acceleration over a time interval. The time interval may be a portion of a time period corresponding to the displacement data that is solely distal the proximal cortex threshold value 340. The time interval may also be determined based on a performance feature of the cutting tool such as the cutting tool diameter or a bone type.

As shown in FIG. 7, setting the proximal cortex threshold value 340 to the selected location is beneficial to exclude displacement data and acceleration events that occur while the drill bit is drilling through a proximal cortical or near cortical. This exclusion mitigates the possibility that breaking through the proximal cortical layer of bone to the cancellous layer of bone is determined as a breakthrough of the entire bone (i.e., through both the proximal and distal cortical bone layers) by the controller 78. As can be appreciated from FIG. 7, it is useful to set the proximal cortex threshold value differently for smaller bones and larger bones. For instance, if the smaller bone displacement and acceleration data were using the same proximal cortex threshold value 340 as the larger bone displacement and acceleration data, all acceleration events may be unintentionally excluded and the controller 78 may be unable to determine a breakthrough depth of the bore. Conversely, if the proximal cortex threshold value used for the smaller bone displacement and acceleration data is used for the larger bone displacement and acceleration data, then the acceleration event for breaking through the proximal cortical layer of the bone may be determined as the breakthrough depth.

Certain characteristics of bone may also help in the accuracy of breakthrough depth determination. For instance, bone hardness for larger bones is typically harder than bone hardness for smaller bones. Determining bone hardness of a proximal cortical layer of bone may be used to predict breakthrough depths of the distal cortical layer of bone.

In one exemplary configuration shown in FIG. 7, the controller may determine the type of bone to be drilled based on the method described above. Once the type of bone is determined, the controller 78 may set a depth threshold value 344 based on the bone type to be drilled. The depth threshold value 344 may be based on an average proximal cortex thickness for a particular bone type.

As shown in FIG. 7, the controller 78 may determine displacement data based on displacement of the cutting tool 66 as the cutting tool 66 advances from a reference point into the bone to form the bore. The displacement data and time data corresponding to the displacement data may be stored in the memory unit. The controller 78 is configured to determine acceleration data (See FIG. 8) based on the displacement data. The controller 78 is configured to determine a proximal cortex acceleration event occurred based on the acceleration data after the cutting tool advances into a proximal cortex of the bone to a depth corresponding to the depth threshold value 344. The proximal cortex acceleration event may correspond with the breakthrough of the drill bit 66 through the proximal cortical layer of the bone. The controller 78 may be configured to determine a proximal cortex acceleration event value of the cutting tool 66 based on the acceleration data. The controller 78 may then determine a proximal cortex acceleration event depth value based on the time at which the proximal cortex acceleration event occurs. The proximal cortex acceleration event depth value may correspond to the thickness of the proximal cortical layer of the bone.

The controller 78 may then determine a plunging speed value of the cutting tool. The plunging speed value may be determined by determining a drilling thickness value based on the displacement data of the cutting tool that corresponds to the proximal cortex acceleration event value. A drilling time value is determined based on time data that corresponds to the proximal cortex acceleration event value. The plunging speed value is based on the drilling thickness value and the drilling time value. In other words, the plunging speed value is a numerical value corresponding to the speed (i.e., velocity) at which the drill bit plunges through the proximal cortical layer of bone based on the thickness of the proximal cortical layer of bone and the time it took for the drill bit to advance from the reference point (e.g. with the tip of the drill bit against an outer layer of cortical bone) to a breakthrough of the proximal cortical layer of bone. In some configurations, the plunging speed value is a numerical value corresponding to the average velocity of the cutting tool from the reference point to the displacement data corresponding to the proximal cortex acceleration event depth value (i.e., breakthrough of the proximal cortical layer of bone).

The bone hardness factor is determined based on the proximal cortex acceleration event value and the plunging speed value. In one configuration, the proximal cortex acceleration event value is a numerical value corresponding to the maximum acceleration of the drill bit 66 as the drill bit breaks through the proximal cortical layer of bone. The bone hardness factor may be used in conjunction with displacement data to determine the depth of the full bore (i.e., bore that extends through the whole bore—through both the proximal and distal cortical layers of the bone).

Referring to FIG. 8, the breakthrough depth of the full bore may be based on the acceleration data solely distal the depth threshold value. Further the breakthrough depth may be based on the one or more distal cortex acceleration events and a distal cortex acceleration event threshold. The distal cortex acceleration event threshold may be based on the bone hardness factor. The distal cortex acceleration event threshold comprises a numerical value that may be based on the acceleration data. The numerical value being set higher for bone hardness factor corresponding to harder bone, and lower for bone hardness factor corresponding to softer bone.

Each of the one or more distal cortex acceleration events is based on an acceleration over a time interval. The time interval may be a portion of a time period corresponding to the displacement data that is solely distal the depth threshold value. The time interval may also be based on the bone hardness factor.

In some configurations, the bone hardness factor may also be determined based on a rotational speed value or torque value of the cutting tool, the proximal cortex acceleration event value, and the plunging speed value. The rotational speed value or torque value of the cutting tool may be determined between a time period from the time corresponding to where the cutting tool is at the reference point and the time corresponding to where the cutting tools is at the depth at which the proximal cortex acceleration event depth value occurs i.e., where the drill bit 66 breaks through the proximal cortical layer of bone. The torque value of the cutting tool may be determined by a current sensor (not shown) disposed within the handpiece housing assembly 74 and based on an electrical current supplied to a motor of the drill.

Although the depth threshold value 344 and the proximal cortex threshold value 340 are illustrated in FIG. 7 as being the same value, it is appreciated that they are used for different purposes. The proximal cortex threshold value 340 is used to exclude a subset of displacement data to improve accuracy of breakthrough determinations by mitigating the opportunity for the controller 78 to interpret proximal cortex breakthrough as distal cortex breakthrough. In contrast, the depth threshold value 344 is used to set an end point of displacement data to use in order to observe bone hardness of the proximal cortical layer to make predictions regarding breakthrough of the distal cortical layer. Further, it is contemplated that the depth threshold value 344 and the proximal cortex threshold value 340 may be different values. In many configurations, both the proximal cortex threshold value 340 and the depth threshold value 344 will correspond with the drill bit 66 being between the proximal and distal cortical layers of bone.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency. In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller 78 may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The controller 78 may communicate with other controllers using the interface circuit(s). Although the controller may be depicted in the present disclosure as logically communicating directly with other controllers, in various implementations the controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the controller may be distributed among multiple controllers that are connected via the communications system. For example, multiple controllers may implement the same functionality distributed by a load balancing system. In a further example, the functionality of the controller may be split between a server (also known as remote, or cloud) controller and a client (or, user) controller.

Some or all hardware features of a controller may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a controller may be defined by a language, such as IEEE 1666-2005 (commonly called "SystemC"), that encompasses both codes, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple controllers. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript °, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

It should be noted that while the surgical system has been realized as a surgical drilling system and the cutting tool a drill bit in many configurations described above, it is contemplated that the surgical system may be realized as another surgical cutting system employing one or more of a blade, a bur, a saw, a rasp, a mill, a reamer, or a trocar pin. It should also be noted that while the surgical system is directed to surgical applications, the surgical system could be employed for non-surgical applications.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention is intended to be defined in the independent claims, with specific features laid out in the dependent claims, wherein the subject matter of a claim dependent from one independent claim can also be implemented in connection with another independent claim.

The present disclosure also comprises the following clauses, with specific features laid out in dependent clauses, that may specifically be implemented as described in greater detail with reference to the configurations and drawings above.

I. A surgical system for cutting into a bone with a cutting tool, the surgical system comprising: a sensor configured to output one or more displacement signals associated with a displacement of the cutting tool during a cutting process; and a controller configured to, determine displacement data of the cutting tool relative to the bone from an initial cutting time and a final cutting time, the displacement data including a displacement value indicative of a proximal surface of a proximal cortex of a bone and a displacement value indicative of a distal surface of a distal cortex of the bone, determine distal cortex acceleration data based on the displacement data, and determine a breakthrough depth of a bore based on the distal cortex acceleration data that is solely distal a proximal cortex threshold value. II. The surgical system of clause I, wherein the proximal cortex threshold value is defined by a function. III. The surgical system of any one of clauses I-II, further comprising a memory unit, wherein the proximal cortex threshold value is stored in the memory unit. IV. The surgical system of any one of clauses I-III, wherein the cutting tool comprises one cutting tool selected from a group of cutting tools consisting of a drill bit, a bur, a saw, a rasp, a mill, a reamer, a blade, and a trocar pin. V. A method of determining a breakthrough depth of a bore formed in a bone by a cutting tool attached to a cutting instrument, the method comprising: determining displacement data of the cutting tool; determining bone type to be cut; determining a bone hardness factor; determining the breakthrough depth of a fully formed bore based on the bone hardness factor and the displacement data. VI. A surgical system for cutting into a bone, the surgical system comprising: a first cutting tool having a first performance feature; a second cutting tool having a second performance feature different from the first performance feature; a sensor configured to output one or more displacement signals associated with a displacement of either of the first and second cutting tools during a cutting process; and a controller configured to, determine displacement data of either of the cutting tools relative to the bone from an initial cutting time and a final cutting time, the displacement data including a displacement value indicative of a proximal surface of a proximal cortex of a bone and a displacement value indicative of a distal surface of a distal cortex of the bone, determine distal cortex acceleration data based on the displacement data, and determine a breakthrough depth of a bore based on the distal cortex acceleration data that is solely distal a proximal cortex threshold value. VII. The surgical system of clause VI, wherein the first cutting tool comprises a first drill bit and second cutting tool comprises a second drill hit and wherein the first drill bit differs from the second drill bit in at least one performance feature selected from a radius, a cutting tip geometry, a material, a length, a cross-sectional area, a drill bit type, a cutting efficiency, a rake angle, a flute angle, a flute depth, and a point angle. VIII. The surgical system of any one of clauses VI-VII, wherein the proximal cortex threshold value is the same for both the first and second cutting tools. IX. A surgical system for cutting into a bone with a cutting tool, the surgical system comprising: a sensor configured to output one or more displacement signals associated with a displacement of the cutting tool during a cutting process; and a controller configured to, determine displacement data of the cutting tool relative to either of a first bone and a second bone different in bone type from the first bone from an initial cutting time and a final cutting time, the displacement data including a displacement value indicative of a proximal surface of a proximal cortex of either of the first and second bones and a displacement value indicative of a distal surface of the distal cortex of either of the first and second bones, determine distal cortex acceleration data based on the displacement data, and determine a breakthrough depth of a bore based on the distal cortex acceleration data that is solely distal a proximal cortex threshold value that is the same for each of the first and second bones.

What is claimed is:

1. A surgical system for cutting into a bone with a cutting tool, the surgical system comprising:
   a first sensor configured to output one or more displacement signals associated with a displacement of the cutting tool during a cutting process;
   a memory unit; and
   a controller configured to,
      determine displacement data of the cutting tool relative to the bone from an initial cutting time and a final cutting time, the displacement data including a displacement value indicative of a proximal surface of a proximal cortex of a bone and a displacement value indicative of a distal surface of a distal cortex of the bone,
      receive a proximal cortex threshold value that is preset, stored in the memory unit, and based on a performance feature of the cutting tool or based on a bone type to be cut, the proximal cortex threshold value being indicative of a displacement value that is distal the proximal cortex, and proximal the distal cortex,
      determine distal cortex acceleration data based on the displacement data, and
      determine a breakthrough depth of a bore based on the distal cortex acceleration data that is solely distal the proximal cortex threshold value.

2. The surgical system of claim 1, further comprising an instrument having a housing and a motor positioned in the housing, the motor configured to apply rotational torque to a drill bit during a drilling process.

3. The surgical system of claim 2, wherein the system further includes at least two drill bits, each of the at least two drill bits having a different performance feature, wherein the system is configured to utilize the same proximal cortex threshold value for each of the at least two drill bits.

4. The surgical system of claim 2, wherein the instrument comprises a second sensor, the second sensor configured to determine a performance feature of the cutting tool based on an identification feature of the cutting tool.

5. The surgical system of claim 4, wherein the memory unit stores a look-up table with performance features correlated to cutting tool identification features, wherein the controller is configured to select a proximal cortex threshold value based on one of the identification features correlating to a performance feature of the cutting tool.

6. The surgical system of claim 1, further comprising a user input device, the user input device configured to receive a bone type from a user, the proximal cortex threshold value being defined as a function of the received bone type.

7. The surgical system of claim 6, further comprising an instrument having a housing and a motor positioned in the housing, the motor configured to operate the cutting tool, wherein the user input device is coupled to the instrument.

8. The surgical system of claim 7, further comprising a measurement module configured to measure displacement of the cutting tool during the cutting process, and the measurement module configured to be coupled to the housing.

9. The surgical system of claim 8, wherein the user input device is separate and remote from the instrument and the measurement module.

10. The surgical system of claim 1, wherein the proximal cortex threshold value is defined as a function of the bone type cut, and wherein the bone type is based on a plate offset used with the system.

11. The surgical system of claim 1, wherein the first sensor is coupled to a measurement module.

12. The surgical system of claim 1, wherein the first sensor comprises an optical displacement sensor.

13. The surgical system of claim 1, wherein the cutting tool comprises one cutting tool selected from a group of cutting tools consisting of a drill bit, a blade, a bur, a saw, a rasp, a mill, a reamer, and a trocar pin.

14. A surgical system for cutting into a bone with a cutting tool, the surgical system comprising:
    a sensor configured to output one or more displacement signals associated with a displacement of the cutting tool during a cutting process;
    a memory unit storing a preset proximal cortex threshold value, the proximal cortex threshold value being indicative of a displacement value that is distal a proximal cortex of the bone, and proximal a distal cortex of the bone;
    a controller configured to,
    determine displacement data of the cutting tool relative to the bone from an initial cutting time and a final cutting time, the displacement data including a displacement value indicative of a proximal surface of the proximal cortex of the bone and a displacement value indicative of a distal surface of the distal cortex of the bone,
    determine distal cortex acceleration data based on the displacement data, and
    determine a breakthrough depth of a bore based on the distal cortex acceleration data that is solely distal the proximal cortex threshold value.

15. The surgical system of claim 14, wherein the cutting tool comprises one cutting tool selected from a group of cutting tools consisting of a drill bit, a bur, a saw, a rasp, a mill, a reamer, a blade, and a trocar pin.

16. A surgical system for cutting into a bone with a cutting tool, the surgical system comprising:
    an instrument having a housing and a motor positioned in the housing, the motor configured to apply rotational torque to a drill bit during a drilling process;
    a first sensor configured to output one or more displacement signals associated with a displacement of the cutting tool during a cutting process;
    a second sensor configured to determine a performance feature of the cutting tool based on an identification feature of the cutting tool;
    a memory unit storing a look-up table with performance features correlated to cutting tool identification features; and
    a controller configured to,
        determine displacement data of the cutting tool relative to the bone from an initial cutting time and a final cutting time, the displacement data including a displacement value indicative of a proximal surface of a proximal cortex of a bone and a displacement value indicative of a distal surface of a distal cortex of the bone,
        receive a proximal cortex threshold value based on one of the identification features correlating to a performance feature of the cutting tool, the proximal cortex threshold value being indicative of a displacement value that is distal the proximal cortex,
        determine distal cortex acceleration data based on the displacement data, and
    determine a breakthrough depth of a bore based on the distal cortex acceleration data that is solely distal the proximal cortex threshold value.

* * * * *